US007257698B2

(12) United States Patent
Kawaguchi

(10) Patent No.: US 7,257,698 B2
(45) Date of Patent: Aug. 14, 2007

(54) INSTRUCTION BUFFER AND METHOD OF CONTROLLING THE INSTRUCTION BUFFER WHERE BUFFER ENTRIES ARE ISSUED IN A PREDETERMINED ORDER

(75) Inventor: Mitsuharu Kawaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 378 days.

(21) Appl. No.: 09/862,471

(22) Filed: May 23, 2001

(65) Prior Publication Data

US 2001/0054138 A1    Dec. 20, 2001

(30) Foreign Application Priority Data

May 24, 2000    (JP) ............... 2000-153452

(51) Int. Cl.
*G06F 9/38* (2006.01)
(52) U.S. Cl. ............ 712/215; 712/216; 712/217
(58) Field of Classification Search .......... 712/214, 712/215, 205, 206, 207, 216, 217
See application file for complete search history.

(56) References Cited

U.S. PATENT DOCUMENTS 5,740,391 A * 4/1998 Hunt .................. 712/200
5,903,918 A * 5/1999 Bauman et al. ........ 711/220
6,157,998 A * 12/2000 Rupley et al. ......... 712/238
6,625,746 B1 * 9/2003 Moore .................. 714/6

FOREIGN PATENT DOCUMENTS

| JP | 60-173634 | 9/1985 |
| JP | 4-313121 | 11/1992 |
| JP | 5-204639 | 8/1993 |
| JP | 2000-181707 | 6/2000 |

OTHER PUBLICATIONS

Hennessy et al. Computer Architecture: A Quantitative Approach, $3^{rd}$ Edition, 2003, Morgan Kaufmann, San Francisco, pp. 182-184.*
Mike Johnson, Superscalar Microprocessor Design, Prentice Hall, 1991, pp. 44-49.*
Japanese office action dated Nov. 20, 2003 with English translation of pertinent portions.

* cited by examiner

*Primary Examiner*—William M. Treat
(74) *Attorney, Agent, or Firm*—Whitham, Curtis, Christofferson & Cook, PC

(57) ABSTRACT

An instruction buffer of the present invention includes a sequence of instructions arranged in an order determined beforehand, and a buffer including entries arranged in a preselected order for storing the sequence of instructions. Any one of the instructions stored in any one of the entries designated by a low entry number is prior, in order, to another instruction stored in another entry designated by a high entry number.

6 Claims, 14 Drawing Sheets

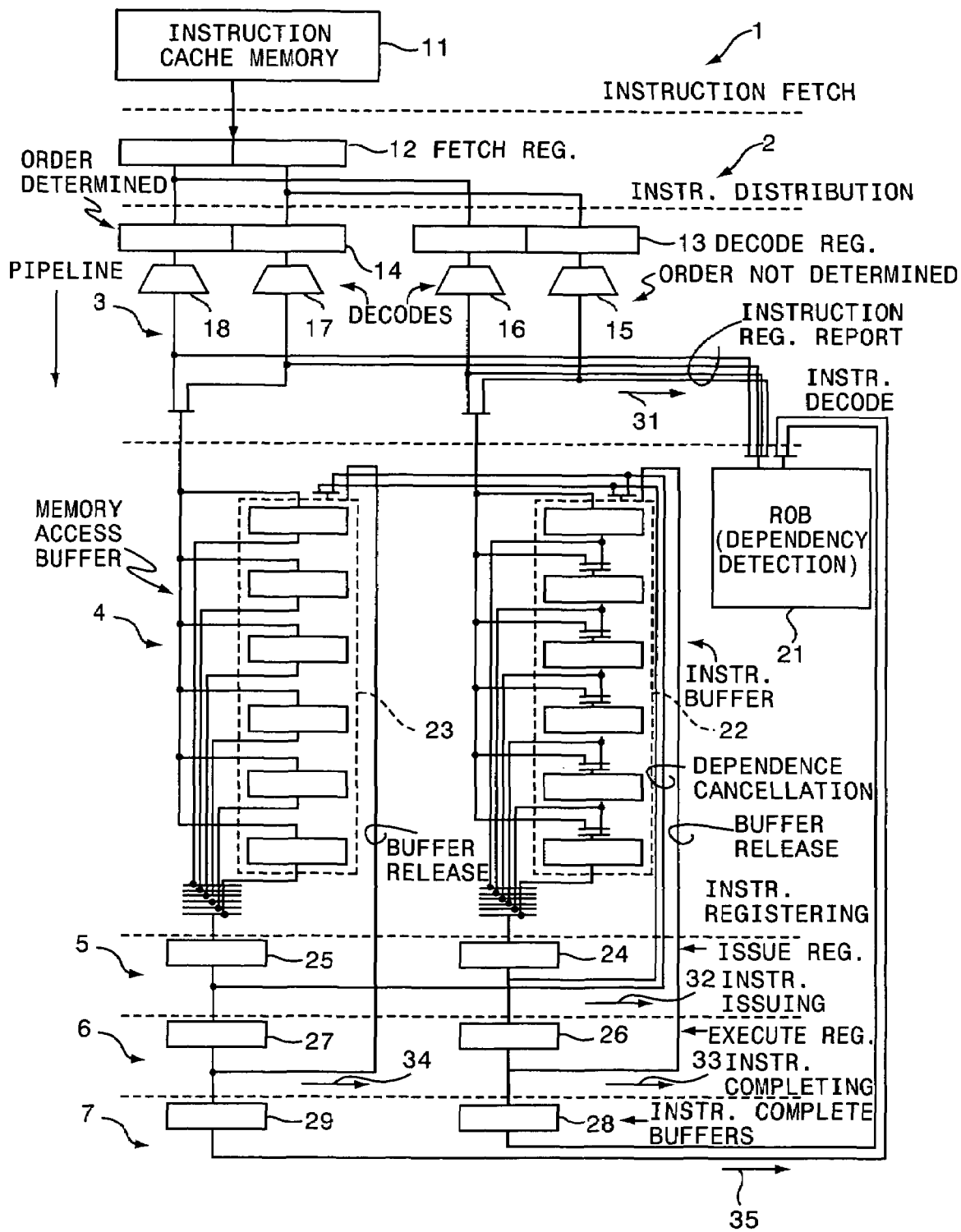

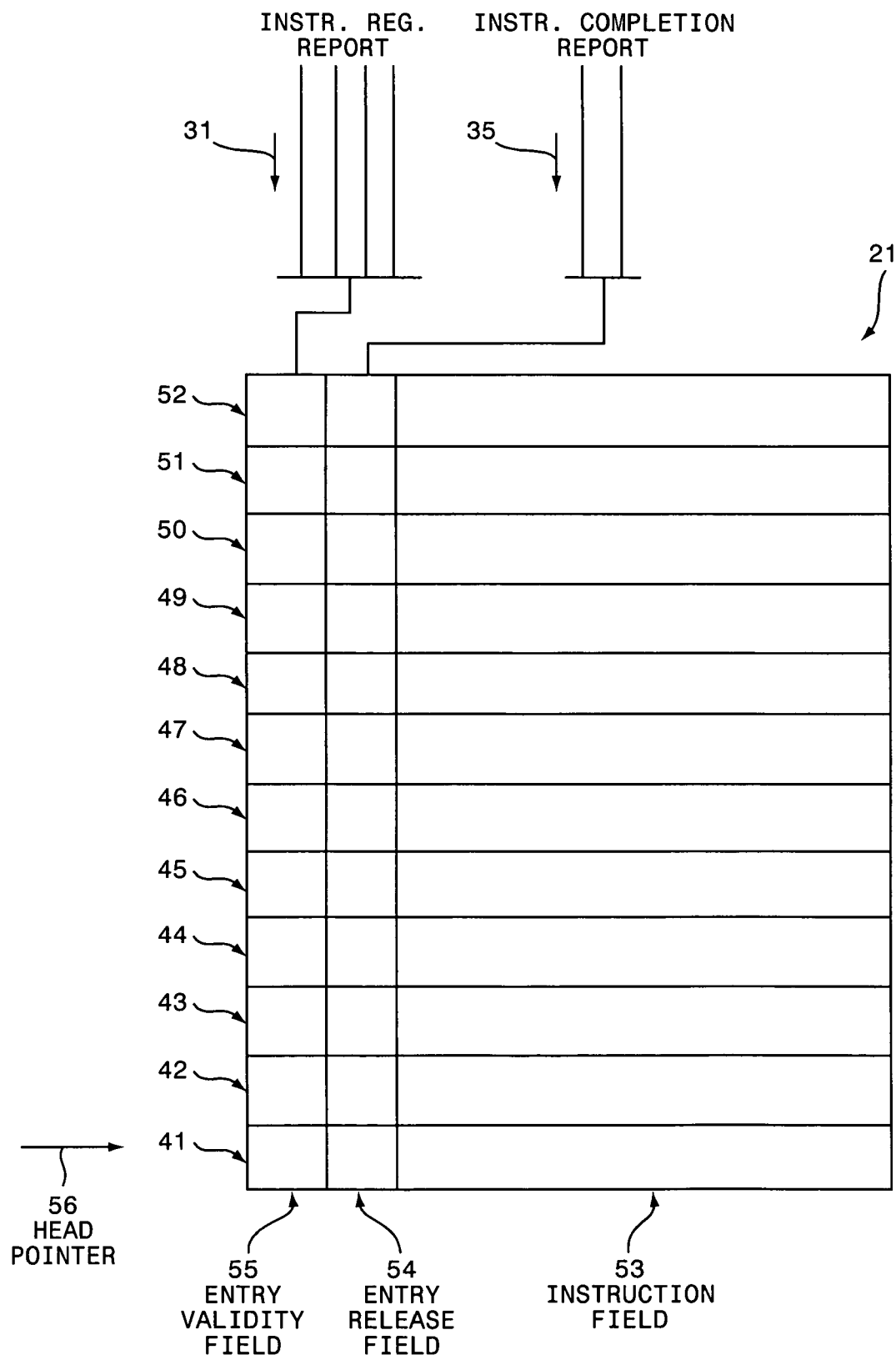

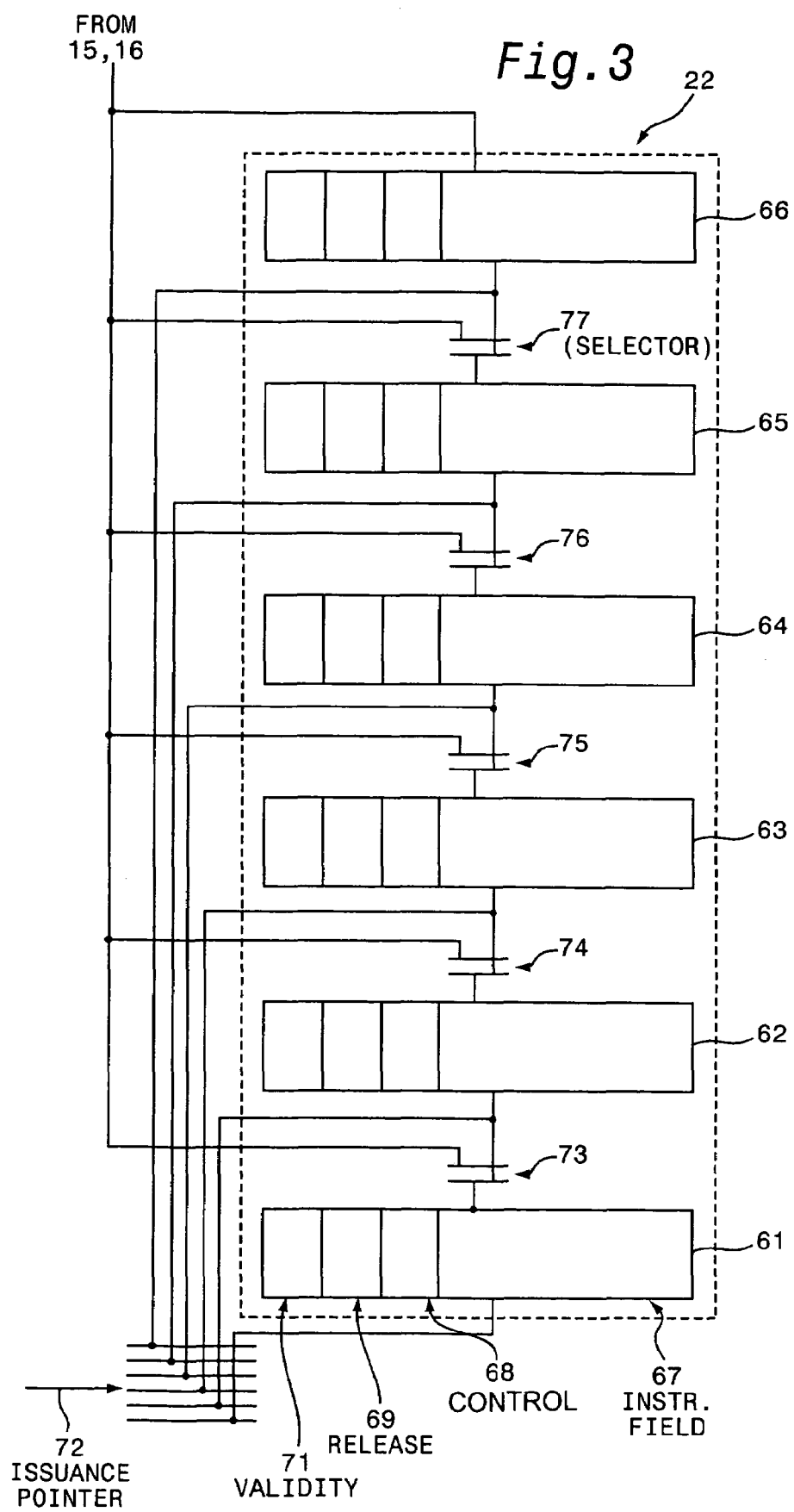

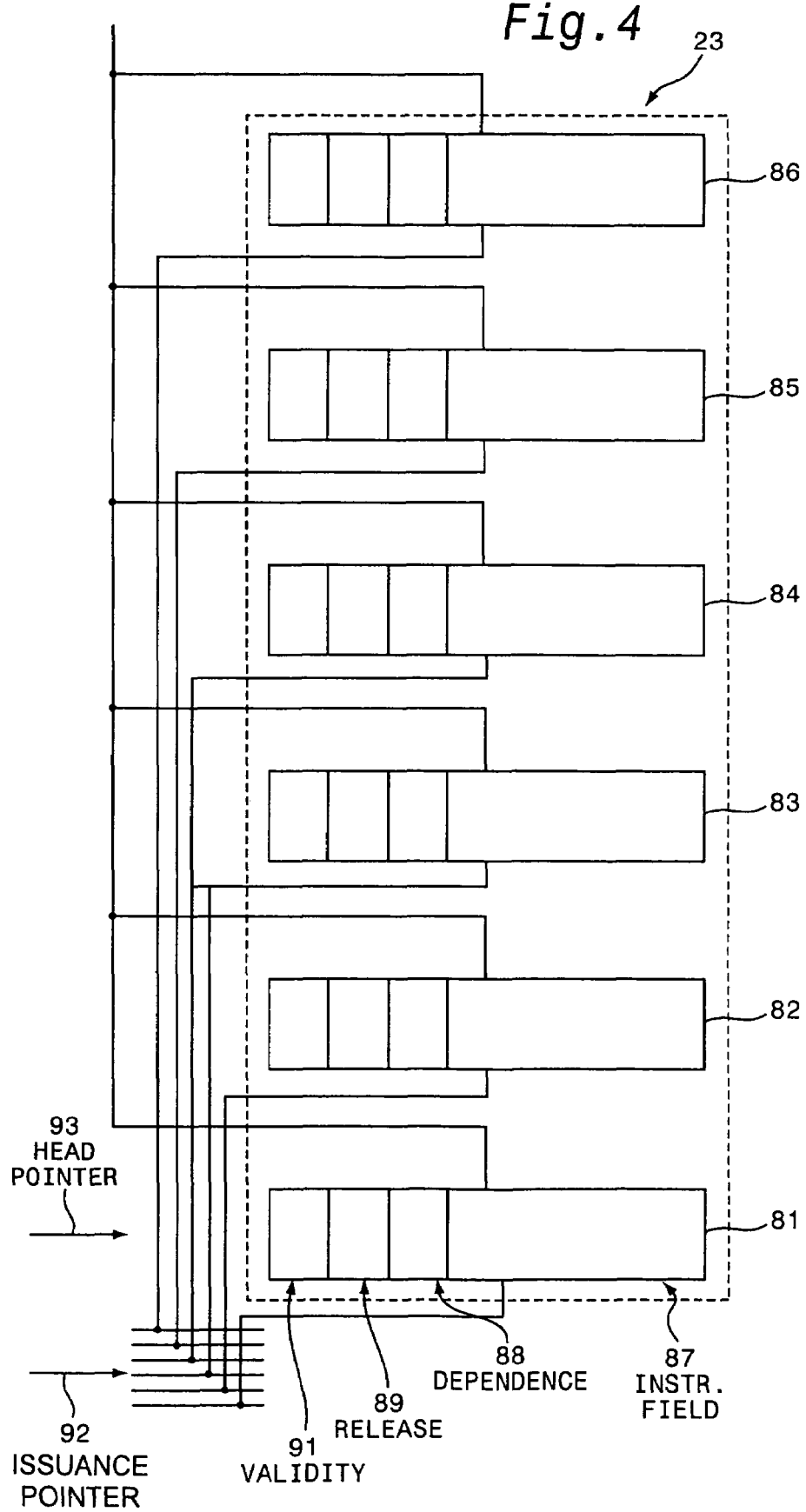

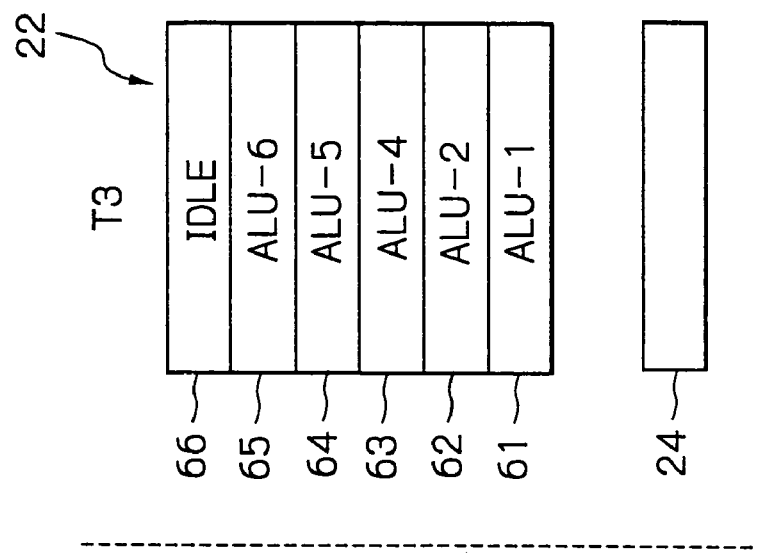
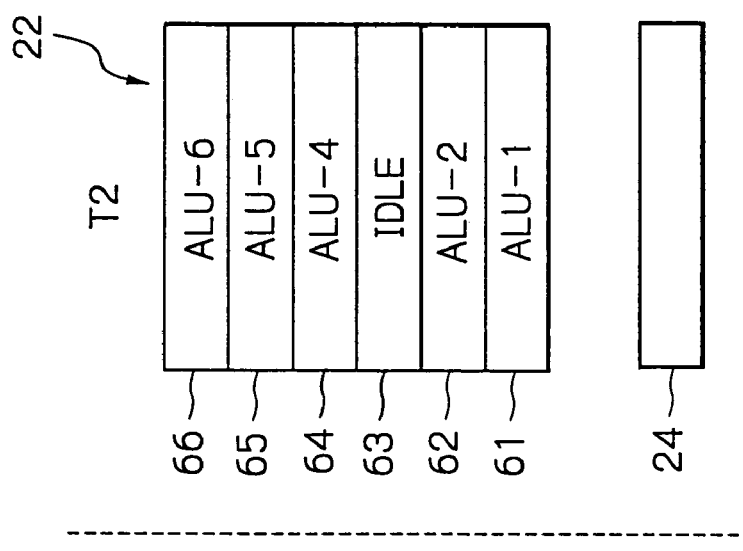
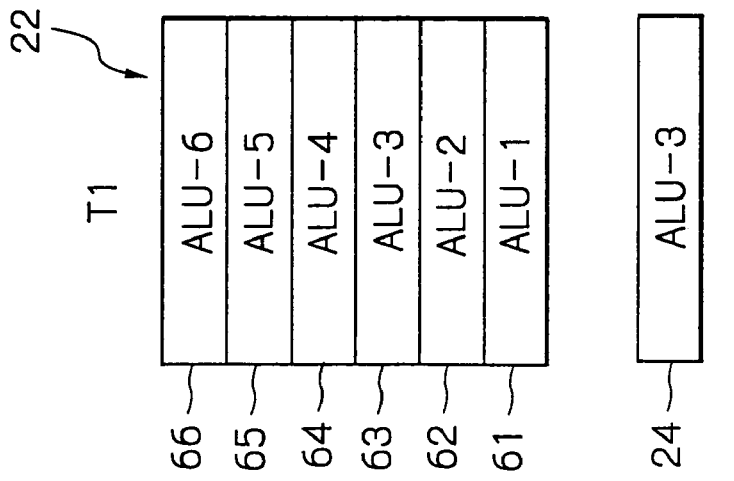

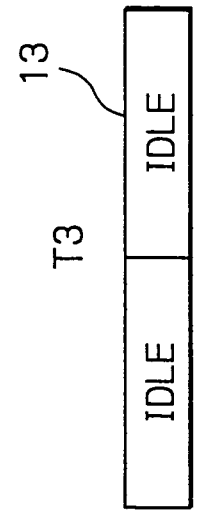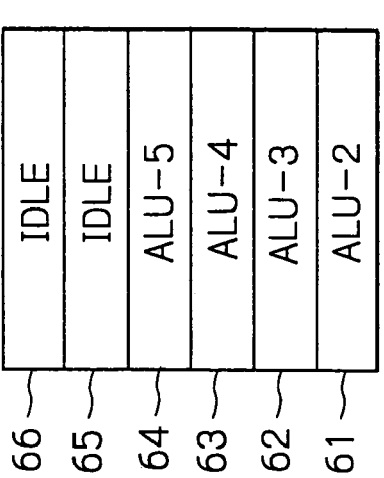
Fig. 6A
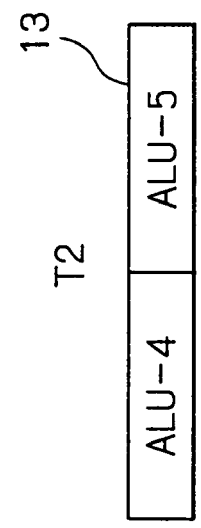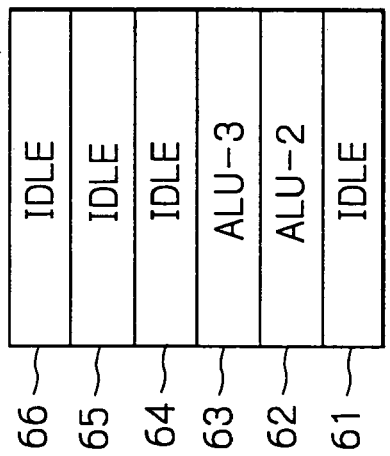
Fig. 6B
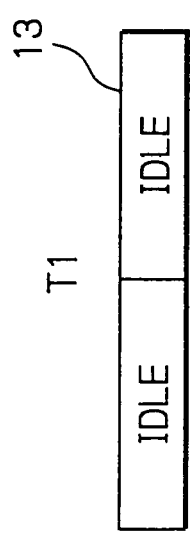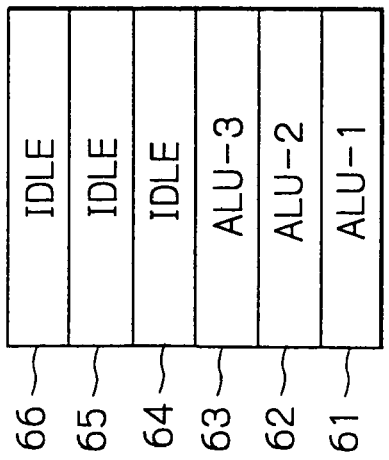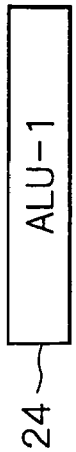
Fig. 6C

US 7,257,698 B2

INSTRUCTION BUFFER AND METHOD OF CONTROLLING THE INSTRUCTION BUFFER WHERE BUFFER ENTRIES ARE ISSUED IN A PREDETERMINED ORDER

BACKGROUND OF THE INVENTION

The present invention relates to an instruction buffer and a buffer queue control method and more particularly to an instruction buffer and a buffer queue control method capable of executing a plurality of instructions at high speed.

Pipeline processing is an implementation for the high-speed execution of a plurality of instructions. Pipeline processing divides the execution of instructions such that a group of instructions can exist at a plurality of different stages at any time. For example, pipeline processing includes a stage for fetching an instruction, a stage for decoding an instruction, a stage for issuing an instruction, and a stage for executing an instruction. An instruction may exist at the instruction issuing stage when another instruction exists at the instruction decoding stage.

Generally, a plurality of instructions are issued by either one of in-order issuance and out-of-order issuance. The in-order issuance sequentially issues instructions in the same order as a program. On the other hand, the out-of-order issuance first executes any instruction ready to be issued without regard to the order of a program.

The out-of-order issuance promotes the efficient issuance of instructions and thereby enhances the efficient use of, e.g., an arithmetic and logic unit (ALU), i.e., high-speed processing. However, the problem with the out-of-order issuance not dependent on a program is that instructions registered earlier than the others are apt to be left unexecuted, preventing instructions dependent on the above instructions from being issued. As a result, an instruction buffer is filled up with instructions, slowing down the entire processing.

Technologies relating to the present invention are disclosed in, e.g., Japanese patent laid-open publication Nos. 63-284673, 9-231203 and 11-272466, Japanese patent application published No. 8-504977, and Japanese Patent 2,503,984.

SUMMARY OF THE INVENTION

It is an object of the present invention to provide an instruction buffer and a buffer queue control method capable of issuing a plurality of instructions at high-speed.

In accordance with the present invention, an instruction buffer includes a sequence of instructions arranged in an order determined beforehand, and a buffer including entries arranged in a preselected order for storing the sequence of instructions. Any one of the instructions stored in any one of the entries designated by a low entry number is prior, in order, to another instruction stored in another entry designated by a high entry number.

Also, in accordance with the present invention, a method of controlling a buffer queue includes the steps of generating a first group of instructions in an order determined beforehand, generating a second group of instructions belonging to the first group of instructions and capable of being executed, and executing one of the second group of instructions highest in order.

BRIEF DESCRIPTION OF THE DRAWINGS

The above and other objects, features and advantages of the present invention will become more apparent from the following detailed description taken with the accompanying drawings in which:

FIG. 1 is a schematic block diagram showing an instruction buffer embodying the present invention;

FIG. 2 is a schematic block diagram showing a specific configuration of a ROB (ReOrder Buffer) included in the illustrative embodiment;

FIG. 3 is a schematic block diagram showing a specific configuration of an operation instruction buffer also included in the illustrative embodiment;

FIG. 4 is a schematic block diagram showing a specific configuration of a memory access instruction buffer further included in the illustrative embodiment;

FIGS. 5A through 8C are timing charts demonstrating a specific operation of the operation instruction buffer;

DESCRIPTION OF THE PREFERRED EMBODIMENT

Figure 7A:
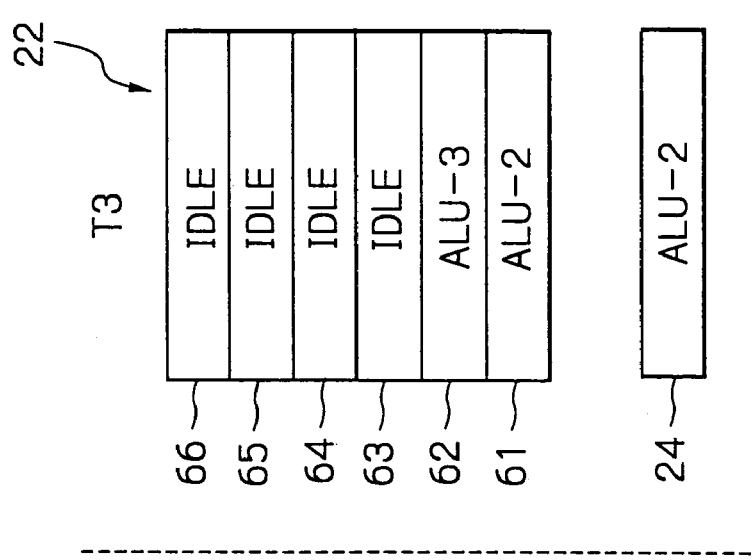

Referring to FIG. 1 of the drawings, an instruction buffer embodying the present invention is shown. As shown, the instruction buffer is generally made up of an instruction fetching stage 1, an instruction distributing stage 2, an instruction decoding stage 3, an instruction registering stage 4, an instruction issuing stage 5, and an instruction completing stage 6.

The instruction fetching stage 1 includes an instruction cache memory 11 that feeds instructions to the instruction distributing stage 2. The instruction distributing stage 2 includes a fetch register 12 connected to the instruction cache memory 11. The fetch register 12 stores the instructions input from the instruction cache memory 11 and classifies them into operation instructions and memory access instructions.

The instruction decoding stage 3 includes a first decode register 13 and a second decode register 14. The first decode register 13 is connected to the fetch register 12 and second decode register 14. The operation instructions whose order is not determined beforehand are registered at the first decode register 13. The operation instructions include both of arithmetic and logical operations. The memory access instructions whose order is determined beforehand are registered at the second decode register 14. The memory access instructions include load instructions and store instructions.

The instruction decoding stage 3 additionally includes a first to a fourth instruction decoder 15 through 18. The first and second instruction decoders 15 and 16 are connected to the decode register 13 while the third and fourth instruction decoders 17 and 18 are connected to the decode register 14.

The instruction decoders 15 and 16 decode the instructions registered at the decode register 13. Likewise, the decode registers 17 and 18 decode the instructions registered at the decode register 14. The instruction decoders 15 through 18 each generate an instruction registration report 31, which indicates that the decoded instruction is to be registered.

The instruction registering stage 4 includes a reorder buffer (ROB) 21, an operation instruction buffer 22, and a memory access instruction buffer 23. the ROB 21 is connected to the instruction decoders 15 through 18 of the instruction decoding stage 3. The ROB 21 sequentially registers all instructions in order of input and sequentially releases them in order of completion. The ROB 21 stores the order of instructions and is used to detect the dependence of on each other and to confirm the completion of instructions. The operation instructions are registered at the operation instruction buffer 22 and then issued, as will be described specifically later. The memory access instructions are registered at the memory access instruction buffer 23 and then issued, as will also be described specifically later.

The instruction issuing stage 5 includes a first and a second instruction issue register 24 and 25. The first instruction issue register 24 is connected to the operation instruction buffer 22. The instruction issue register 24 stores instructions issued from the operation instruction buffer 22 and delivers a dependence cancellation report 32 to the operation instruction buffer 22 and memory access instruction buffer 23. The dependence cancellation report 32 shows which instruction has been issued. The second instruction issue register 25 is connected to the memory access instruction buffer 23. The instruction issue register 25 stores the instructions issued from the memory access instruction buffer 23 and also delivers the dependence cancellation report 32 to the operation instruction buffer 22 and memory access instruction buffer 23.

The instruction executing stage 6 includes a first and a second instruction execute register 26 and 27. The first instruction execute register 26 is connected to the operation instruction buffer 22 and sends a buffer release report 33 to the operation instruction buffer 22. The buffer release report 33 shows whether or not the buffer may be released. The second instruction execute register 27 is connected to the instruction issue register 25 and memory access instruction buffer 23 and sends a buffer release report 34 to the buffer 23. The buffer release report 34, like the report 33, shows whether or not the buffer may be released.

The instruction completing stage 7 includes a first and a second instruction complete register 28 and 29. The first instruction complete register 28 is connected to the instruction execute register 26 and ROB 21 and sends a instruction completion report 35 to the ROB 21. The instruction completion report 35 shows whether or not an instruction has been completed. The second instruction completion register 29 is connected to the instruction execute register 27 and ROB 21 and also sends the instruction completion report 35 to the ROB 21.

FIG. 2 shows a specific configuration of the ROB 21. As shown, the ROB 21 has entries #41 through #52 each having an instruction field 53, an entry release field 54 and an entry validity field 55. The entry release field 54 shows whether or not the instruction 53 associated therewith may be released. The entry validity field 55 shows whether or not the instruction 53 associated therewith is valid. The ROB 21 validates any one of the entries #41 through #52 in response to the instruction registration report 31 or releases it in response to the instruction completion report 35.

FIG. 3 shows the operation instruction buffer 22 in detail. As shown, the operation instruction buffer 22 has entries #61 through #66 and selectors 73 through 77 that are connected to the instruction decoders 15 and 16. The entry #66 is connected to the selector 77 that is, in turn, connected to the entry #65. The entry #65 is connected to the selector 76 that is, in turn, connected to the entry #64. The entry #64 is connected to the selector 75 that is, in turn, connected to the entry #63. The entry #63 is connected to the selector 74 that is, in turn, connected to the entry #62. Further, the entry #62 is connected to the selector 73 that is in turn, connected to the entry #61. The entries #61 through #66 are connected to the instruction issue register 24 as well.

The entries #61 through #66 each have an instruction field 67, a dependence control field 68, an entry release field 69, and an entry validity field 71. The dependence control field 68 shows whether or not the instruction associated therewith is dependent on another instruction. The entry release field 69 shows whether or not the entry to which it belongs may be released. The entry validity field 71 shows whether or not the entry to which it belongs is valid.

The selectors 73 through 77 register instructions at the entries #61 through #66, respectively, and execute buffer queue control. Specifically, when the entry #61 is released, the selector 73 shifts registration stored in the entry #62 to the entry #61. Likewise, when the entry #62 is released, the selector 74 shifts registration stored in the entry #63 to the entry #62. When the entry #63 is released, the selector 75 shifts registration stored in the entry #64 to the entry #63. When the entry #64 is released, the selector 76 shifts registration stored in the entry #65 to the entry #64. Further, when the entry #65 is released, the selector 77 shifts registration stored in the entry #66 to the entry #65.

In FIG. 3, a new operation instruction is registered at invalid one of the entries #61 through #66 and may be registered thereat at the same time as buffer queue control. The operation instruction buffer 22 issues an operation instruction not dependent on another instruction and belonging to the entry to which the smallest number is assigned. The buffer 22 additionally includes an issue pointer 72 for controlling the issuance of an operation instruction. An operation instruction may be issued at the same time as buffer queue control, if desired.

FIG. 4 shows the memory access instruction buffer 23 in detail. As shown, the memory access instruction buffer 23 includes entries #81 through #86 that are connected to the instruction decoders 17 and 18 and instruction issue register 25. The entries #81 through #86 each have a instruction field 87, a dependence control field 88, an entry release field 89, and an entry validity field 91. The dependence control field 88 shows whether or not a instruction associated therewith is dependent on another instruction. The entry release field 89 shows whether or not the entry to which it belongs maybe released. The entry validity field 91 shows whether or not the entry to which it belongs is valid.

The memory access instruction buffer 23 additionally includes an issuance pointer 92 and a head pointer 93. The issuance pointer 92 controls the issuance of an instruction such that an instruction not dependent on another instruction and registered for the first time is issued, i.e., executes in-order issuance. The head pointer 93 indicates the entry from which an instruction has been issued last time.

Reference will be made to FIGS. 5A through 5C for describing the buffer queue control unique to the illustrative embodiment. As shown, the buffer queue control proceeds at three consecutive timings T1 through T3. At the timing T1, an instruction registered at a particular entry is selected and issued to the instruction issue register 24. At the timing T2 that occurs several clock pulses later than the timing T1, the above particular entry is released. Subsequently, at the timing T3, the buffer queue is controlled.

More specifically, as shown in FIG. 5A, assume that operation instructions ALU-1 through ALU-6 are registered at the entries #61 through #66, respectively. At the timing T1, the operation instruction ALU-3 stored in the entry #63 is selected and issued to the instruction issue register 24 by way of example. As shown in FIG. 5B, at the timing T2, the above entry #63 is released and idle. As shown in FIG. 5C, at the timing T3, the operation instructions ALU-4 through ALU-6 are shifted to the entries #63 through #65, respectively, so that the entry #66 is idle.

How the illustrative embodiment registers operation instructions while executing the buffer queue control will be described with reference to FIGS. 6A through 6C. As shown in FIG. 6A, at the timing T1, assume that operation instructions ALU-1 through ALU-3 are registered at the entries #61 through #63, respectively, and that the entries #64 through #66 are idle. Also, the decode register 13 is idle. The operation instruction ALU-1 is shown as being selected and issued to the instruction issue register 24.

As shown in FIG. 6B, at the timing T2, the entry #61 is idle. At this time, assume that new operation instructions ALU-4 and ALU-5 are registered at the decode register 13. As shown in FIG. 6C, at the timing T3, the operation instructions ALU-2 and ALU-3 are shifted to the entries #61 and #62, respectively. At the same time, the new operation instructions ALU-4 and ALU-5 are registered at the entries #63 and #64, respectively. As a result, the decode register 13 becomes idle. In this manner, new operation instructions can be registered while the buffer queue control is under way.

Figure 7B:
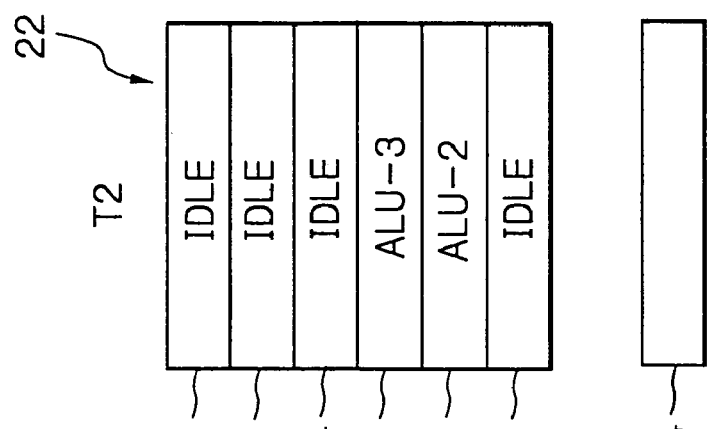
Figure 7C:
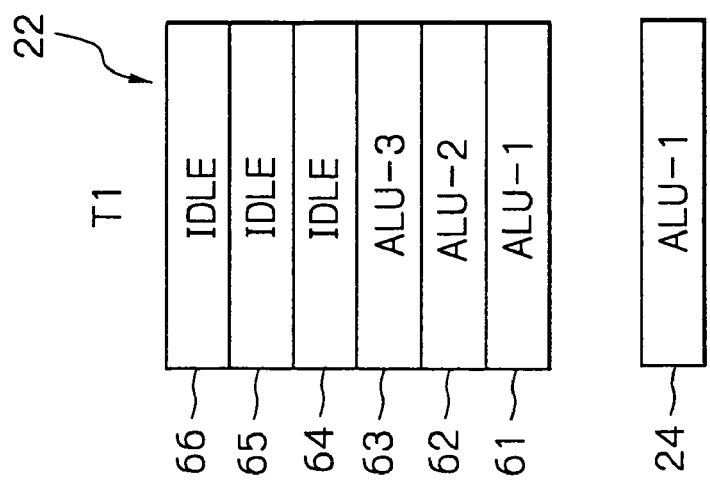

FIGS. 7A through 7C demonstrate how the illustrative embodiment issues an operation instruction while executing the buffer queue control. As shown in FIG. 7A, at the timing T1, the operation instructions ALU-1 through ALU-3 are registered at the entries #61 through #63, respectively. The other entries #64 through #66 are idle. The operation instruction ALU-1 is shown as being issued to the instruction issue register 24 by way of example. As shown in FIG. 7B, at the timing T2, the entry #61 is idle. As shown in FIG. 7C, at the timing T3, the operation instructions ALU-2 and ALU-3 are shifted to the entries #61 and #62, respectively, while the operation instruction ALU-2 is issued to the instruction issue register 24. In this manner, the illustrative embodiment issues an operation instruction while executing the buffer queue control.

Figure 8A:
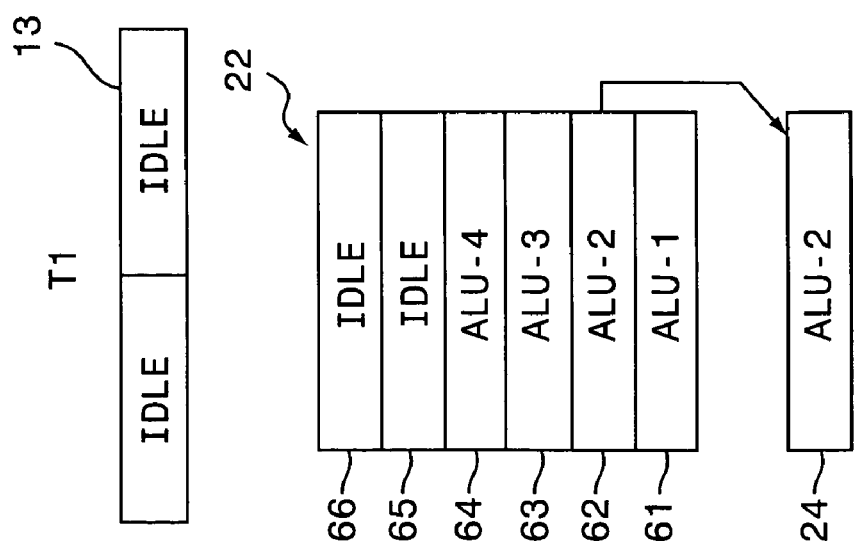
Figure 8B:
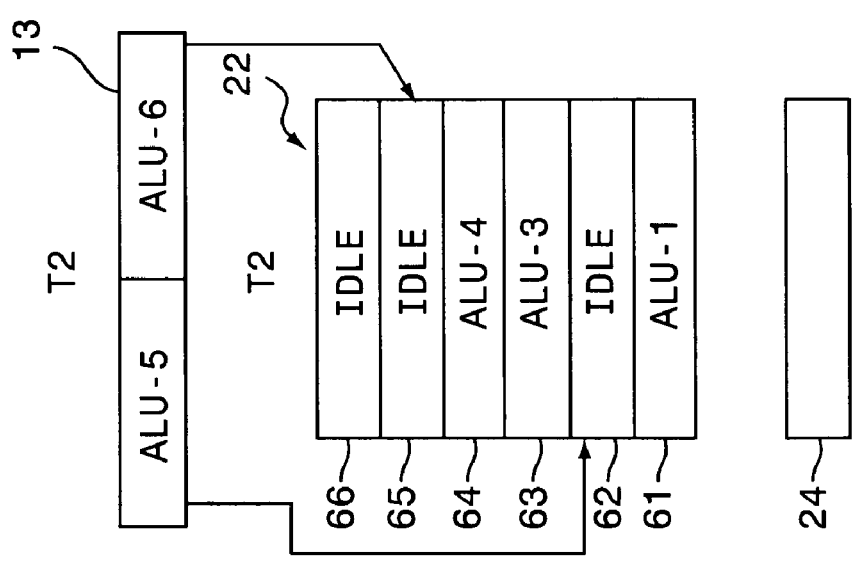
Figure 8C:
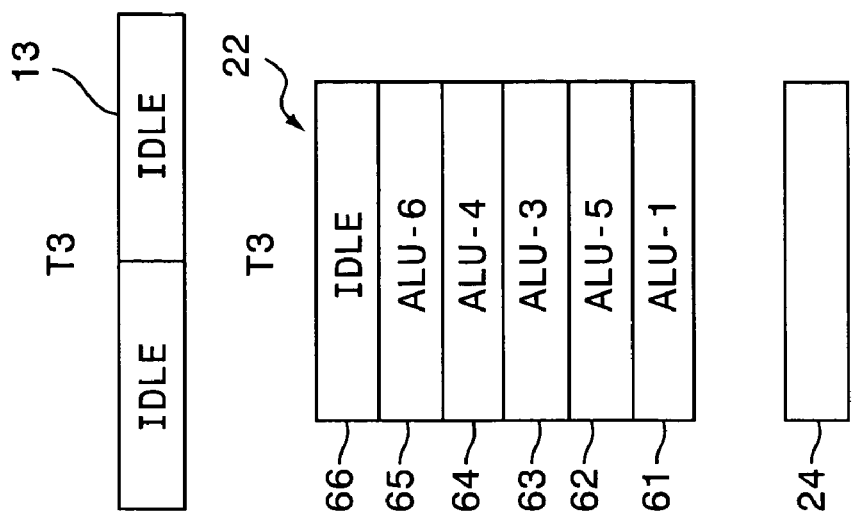

FIGS. 8A through 8C show consecutive conditions to occur when the above-described buffer queue control is not executed. As shown in FIG. 8A, assume that at the timing T1 the operation instructions ALU-1 through ALU-4 are registered at the entries #61 through #64, respectively, while the entries #65 and #66 are idle, and that the operation instruction ALU-2 is selected and issued to the instruction issue register 24. Then, as shown in FIG. 8B, the entry #62 is idle at the timing T2. Assume that new operation instructions ALU-5 and ALU-6 are registered at the decode register 13 at the timing T2. Then, as shown in FIG. 8C, the operation instructions ALU-5 and ALU-6 are registered at the entries #62 and #65, respectively, with the decode register 13 being idle. That is, priority is given to the operation instruction ALU-5 over the operation instructions ALU-3 and ALU-4 despite that the former has been registered after the latter. It is therefore impossible to maintain the order of instructions.

Figure 9:
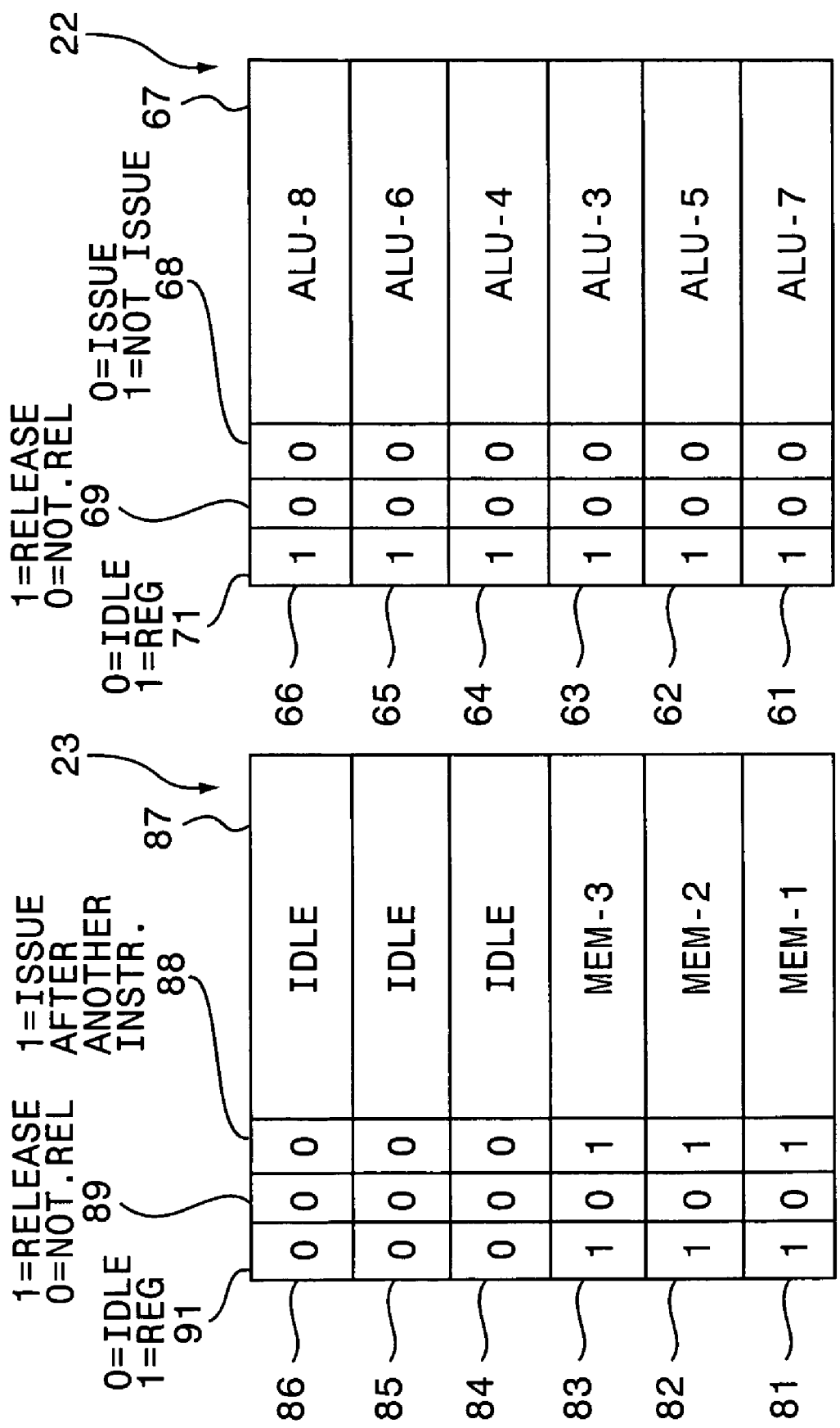
FIG. 9 shows specific conditions of the operation instruction buffer and memory access instruction buffer to occur when buffer queue control is not executed.

FIG. 9 shows specific conditions of the operation instruction buffer 22 and memory access instruction buffer 23 to occur when the buffer queue control is not executed. As for the operation instruction buffer 22, when the dependence control field 68 is (logical) ONE, it shows that the operation instruction associated therewith should be issued after another instruction. The dependence control field 68 shows that the associated operation instruction may be issued when it is (logical) ZERO. The entry release field 69 shows that the associated entry may be released when it is ONE or that the entry should not be released when it is ZERO. The entry validity field 71 shows that an operation instruction is registered at the associated entry when it is ONE or that the entry is idle when it is ZERO.

In the specific condition shown in FIG. 9, operation instructions ALU-7, ALU-5 and ALU-3 are registered at the entries #61, #62 and #63, respectively. Further, operation instructions ALU-4, ALU-6 and ALU-8 are registered at the entries #64, #65 and #66, respectively.

As for the memory access instruction buffer 23, when the dependence control field 88 is ONE, it shows that the memory access instruction associated therewith should be issued after another instruction. The dependence control field 88 shows that the associated memory access instruction may be issued when it is ZERO. The entry release field 89 shows that the associated entry may be released when it is ONE or that the entry should not be released when it is ZERO. The entry validity field 91 shows that a memory access instruction is registered at the associated entry when it is ONE or that the entry is idle when it is ZERO. In the condition shown in FIG. 9, memory access instructions MEM-1, MEM-2 and MEM-3 are registered at the entries #81, #82 and #83, respectively, while the entries #84 through #86 are idle.

Assume that the memory access instruction MEM-1 is dependent on the operation instruction ALU-3 and should be issued after the instruction ALU-3. Also, assume that the memory access instruction MEM-2 is dependent on the operation instruction ALU-4 and should be issued after the instruction ALU-4. Further, assume that the memory access instruction MEM-3 is dependent on the operation instruction ALU-5 and should be issued after the instruction ALU-5.

Figure 10:
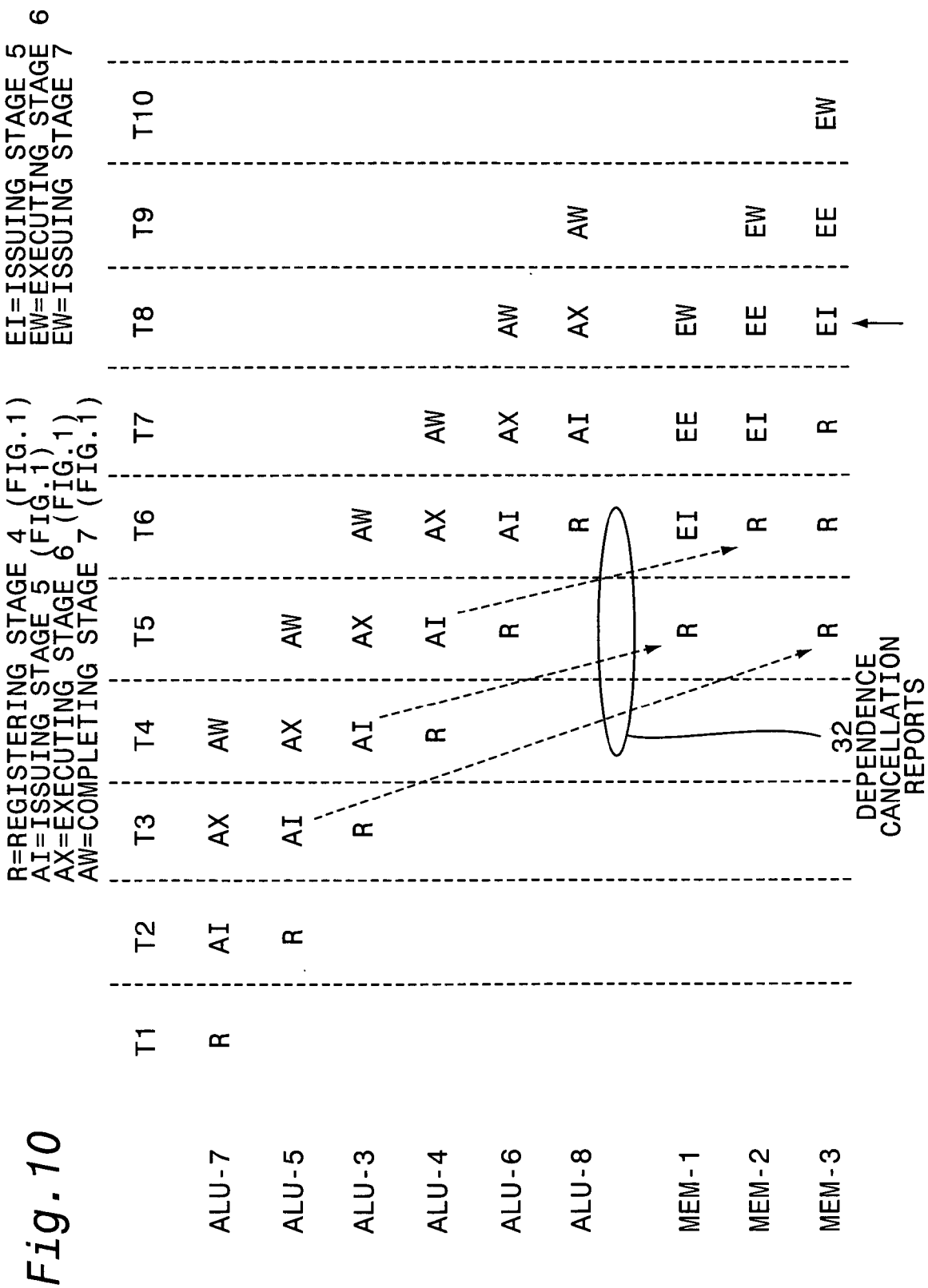
FIG. 10 is a timing chart showing the conditions of instructions registered as shown in FIG. 9.

FIG. 10 is a timing chart showing the conditions of the memory access instructions MEM-1 through MEM-3 and operation instructions ALU-3 through ALU-8 registered as shown in FIG. 9. In FIG. 10, alphabets R, AI, AX and AW respectively denote the instruction registering stage 4, instruction issuing stage 5, instruction executing stage 6, and instruction completing stage 7. Likewise alphabets EI, EE and EW respectively denote the instruction issuing stage 5, instruction executing stage 6, and instruction completing stage 7.

The memory access instructions MEM-1 through MEM-3 each have dependence and are therefore not issued unless the dependence cancellation report 32 is output. In addition, the instructions MEM-1 through MEM-3 are sequentially issued in order of entry number in buffer 23. The operation instructions ALU-3 through ALU-8 do not have dependence and are therefore sequentially issued in order of entry number in buffer 22.

As shown in FIG. 10, at a timing T1, the operation instruction ALU-7 is registered. At a timing T2, the operation instruction ALU-7 is issued. At a timing T3, the operation instruction ALU-7 is executed while the operation instruction ALU-5 is issued. At this instant, the dependence cancellation report 32 is output. At a timing T4, the operation instruction ALU-7 is completed while the operation instruction ALU-5 is executed. At the same time, the operation instruction ALU-3 is issued. Further, the dependence cancellation report 32 is output in order to cancel the dependence of the memory access instruction MEM-3.

At a timing T5, the operation instruction ALU-5 is completed while the operation instruction ALU-3 is executed. Further, the operation instruction ALU-4 is issued. At the same time, the dependence cancellation report 32 is output in order to cancel the dependence of the memory access instruction MEM-1.

At a timing T6, the operation instruction ALU-3 is completed while the operation instruction ALU-4 is executed. Further, the operation instructions ALU-6 and memory access instruction MEM-1 are issued. Again, the dependence cancellation report 32 is output in order to cancel the dependence of the memory access instruction MEM-2.

At a timing T7, the operation instruction ALU-4 is completed while the operation instruction ALU-6 is executed. At the same time, the operation instruction ALU-8 is issued. Further, the memory access instruction MEM-1 is executed while the memory access instruction MEM-2 is issued. At a timing T8, the operation instruction ALU-6 is completed while the operation instruction ALU-8 is executed. Further, the memory access instruction MEM-1 is completed, the memory access instruction MEM-2 is executed, and the memory access instruction MEM-3 is issued.

At a timing T9, the operation instruction ALU-8 and memory access instruction MEM-2 are completed. At a timing T10, the memory access instruction MEM-3 is completed. In this manner, the sequence shown in FIG. 10 needs ten consecutive timings T1 through T10 for completing all of the instructions.

Figure 11:
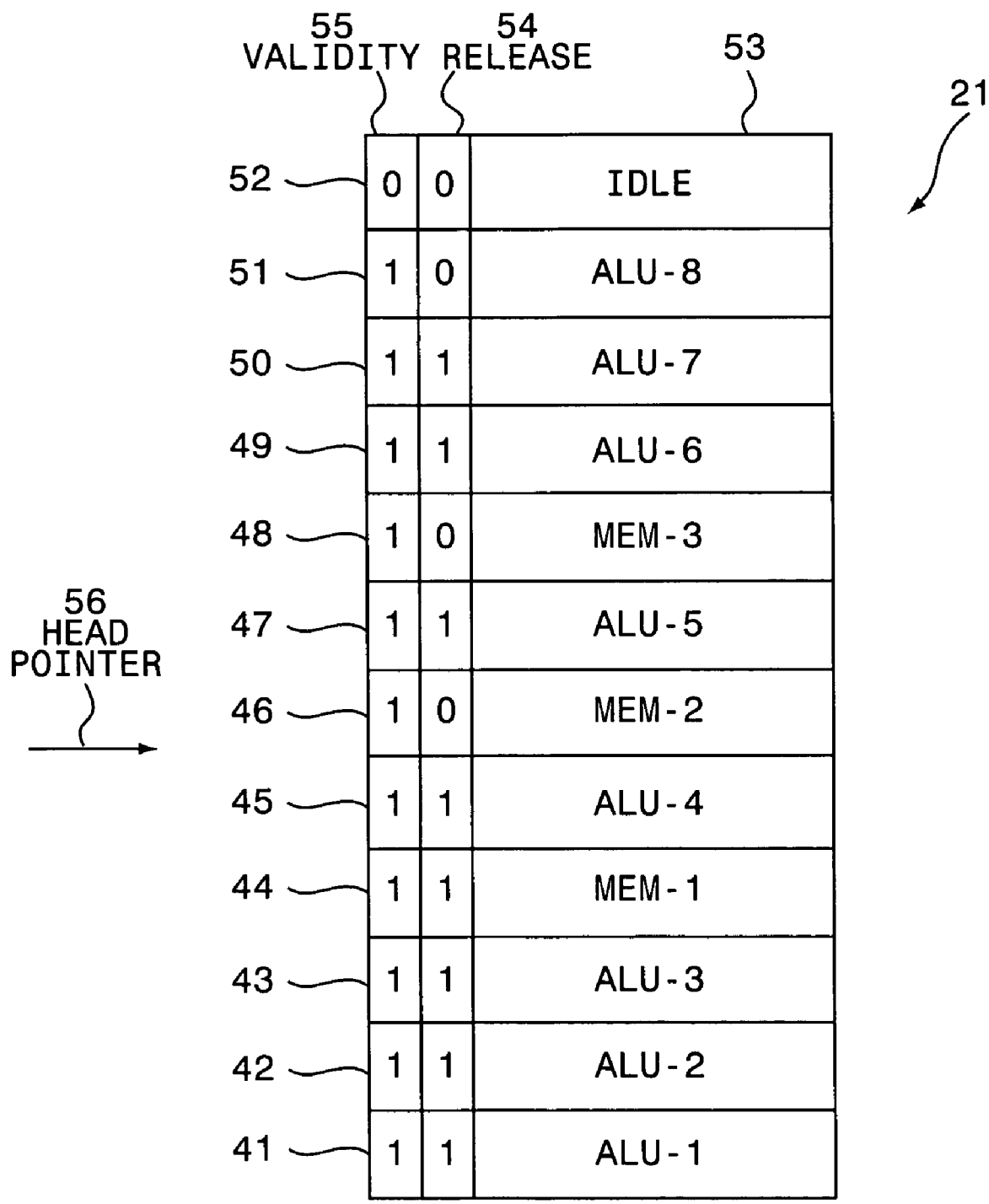
FIG. 11 shows the condition of the ROB to occur at a particular timing shown in FIG. 10.

FIG. 11 shows the instantaneous condition of the ROB 21 holding at the timing T8 indicated by an arrow in FIG. 10. As shown, the operation instructions ALU-1 through ALU-3 are registered at the entries #41 through #43, respectively. The memory instructions MEM-1 through MEM-3 are registered at the entries #44, #46 and #48, respectively. The operation instructions ALU-4 and ALU-5 are registered at the entries #45 and #47, respectively. Further, the operation instructions ALU-6 through ALU-8 are registered at the entries #49 through #51, respectively. The entry #52 is idle.

The entries #41 through #52 of the ROB 21 each are not released unless the instruction registered earlier is released. Although the entries 47, 49 and 50 are ready to be released, the head pointer 56 still points the entry #46 because the entry #46 has not been released yet.

Figure 12:
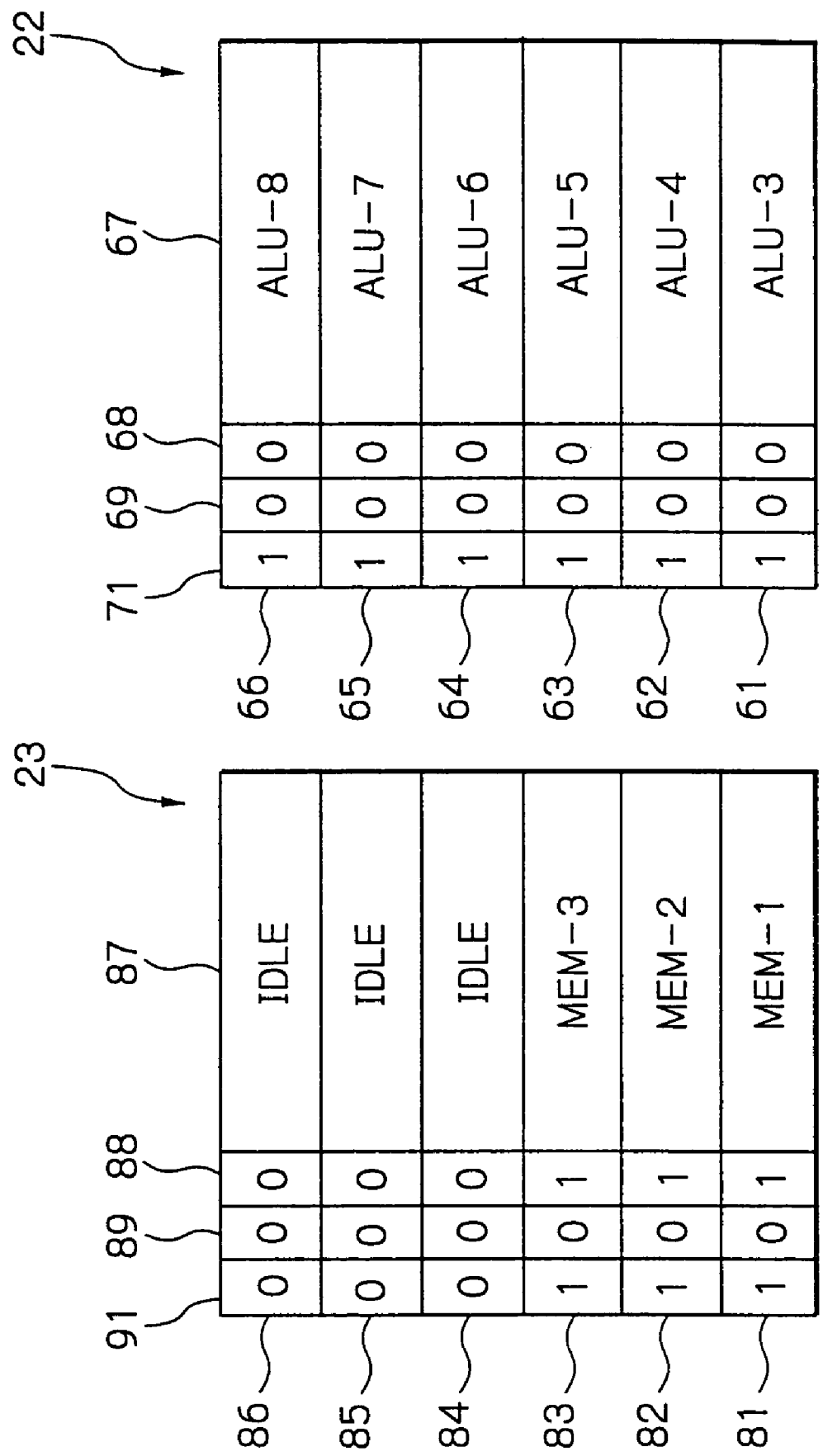
FIG. 12 shows specific conditions of the operation instruction buffer and memory access instruction buffer to occur when buffer queue control is executed.

FIG. 12 shows the conditions of the operation instruction buffer 22 and memory access buffer 23 to occur when the buffer queue control is executed. As shown, the operation instructions ALU-3 through ALU-8 are respectively registered at the entries #61 through #66 of the operation instruction buffer 22. The memory access instructions MEM-1 through MEM-3 are respectively registered at the entries #81 through #83 of the memory access instruction buffer 23. The entries #84 through #86 of this buffer 23 are idle.

The memory access instruction MEM-1 is dependent on the operation instruction ALU-3 and should therefore be issued after the instruction ALU-3. Likewise, the memory access instruction MEM-2 is dependent on the operation instruction ALU-4 and should be issued after the instruction ALU-4. Further, the memory access instruction MEM-3 is dependent on the operation instruction ALU-5 and should be issued after the instruction ALU-5.

Figure 13:
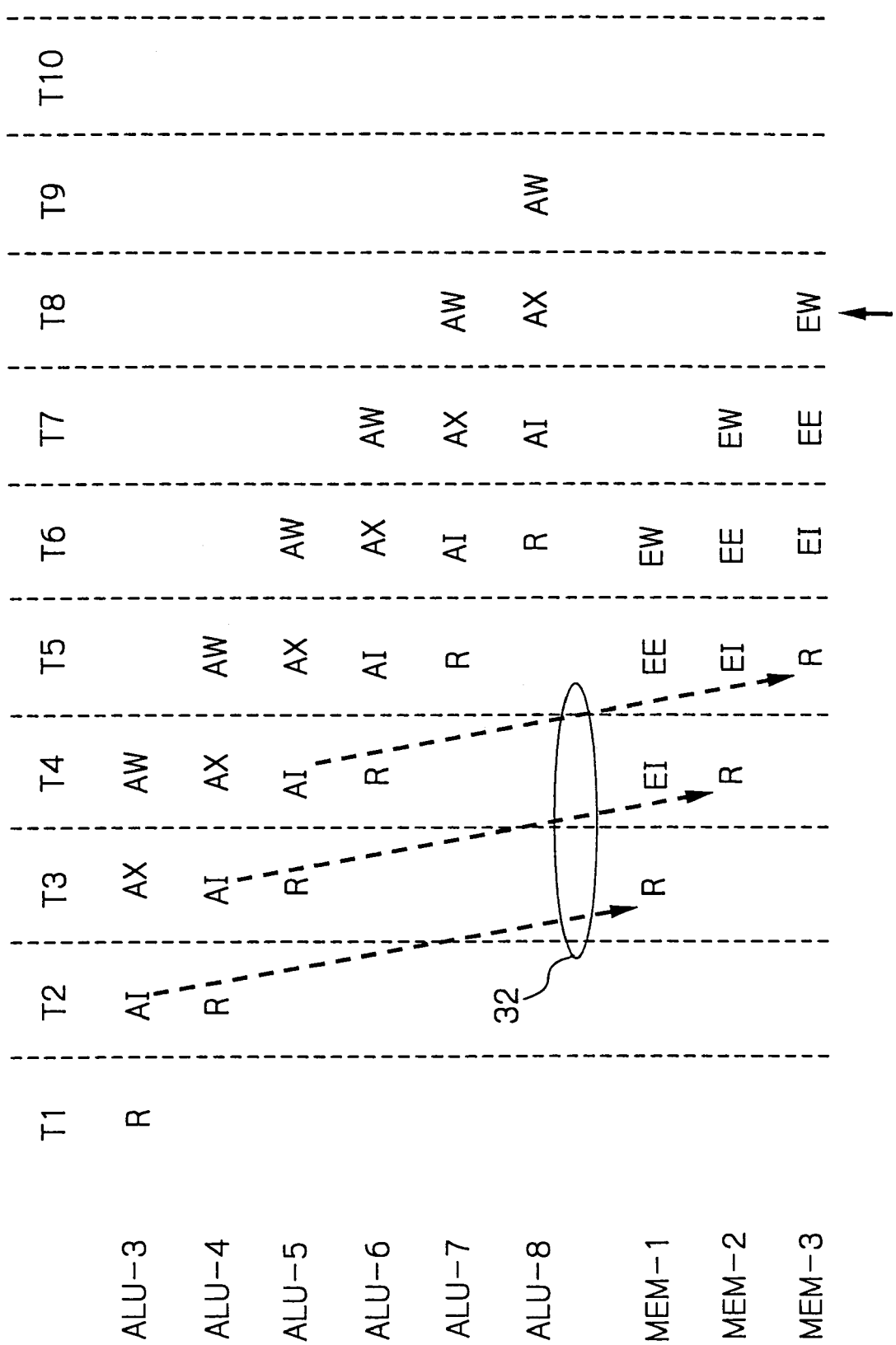
FIG. 13 is a timing chart showing the conditions of instructions registered as shown in FIG. 12.

FIG. 13 is a timing chart demonstrating how the memory access instructions MEM-1 through MEM-3 and operation instructions ALU-3 through ALU-8, registered as shown in FIG. 12, are dealt with. Briefly, the memory access instructions MEM-1 through MEM-3 each have dependence and are therefore not issued unless the dependence cancellation report 32 is output. In addition, the instructions MEM-1 through MEM-3 are sequentially issued in order of entry number in buffer 23. The operation instructions ALU-3 through ALU-8 have no dependence and are therefore sequentially issued in order of entry number in buffer 22.

Specifically, at the timing T2 shown in FIG. 13, the operation instruction ALU-3 is issued while the dependence cancellation report 32 is output. At the timing T3, the operation instruction ALU-3 is executed while the operation instruction ALU-4 is issued. In addition, the dependence cancellation report 32 is again output. In response, the dependence of the memory access instruction MEM-1 is canceled.

At the timing T4, the operation instruction ALU-3 is completed while the operation instruction ALU-4 is executed. At the same time, the operation instruction ALU-5 is issued, and the dependence cancellation report 32 is output. Further, the memory access instruction MEM-1 is issued. In response to the above report 32, the dependence of the memory access instruction MEM-2 is canceled.

At the timing T5, the operation instruction ALU-4 is completed while the operation instruction ALU-5 is executed. At the same time, the operation instruction ALU-6 is issued while the access memory instruction MEM-2 is issued. In response to the dependence cancellation report 32, the dependence of the memory access instruction MEM-3 is canceled.

At the timing T6, the operation instruction ALU-5 is completed while the operation instruction ALU-6 is executed. Further, the memory access instruction MEM-1 is completed while the memory access instruction MEM-2 is executed. In addition, the memory access instruction MEM-3 is issued.

At the timing T7, the operation instruction ALU-6 is completed while the operation instruction ALU-7 is executed. At the same time, the operation instruction ALU-8 is issued while the memory access instruction MEM-2 is issued. In addition, the memory access instruction MEM-3 is executed.

At the timing T8, the operation instruction ALU-7 is completed while the operation instruction ALU-8 is executed. At the same time, the memory access instruction MEM-3 is completed. Finally, at the timing T9, the operation instruction ALU-8 is completed. In this manner, nine consecutive timings T1 through T9 are necessary for all of the instructions to be completed.

Figure 14:
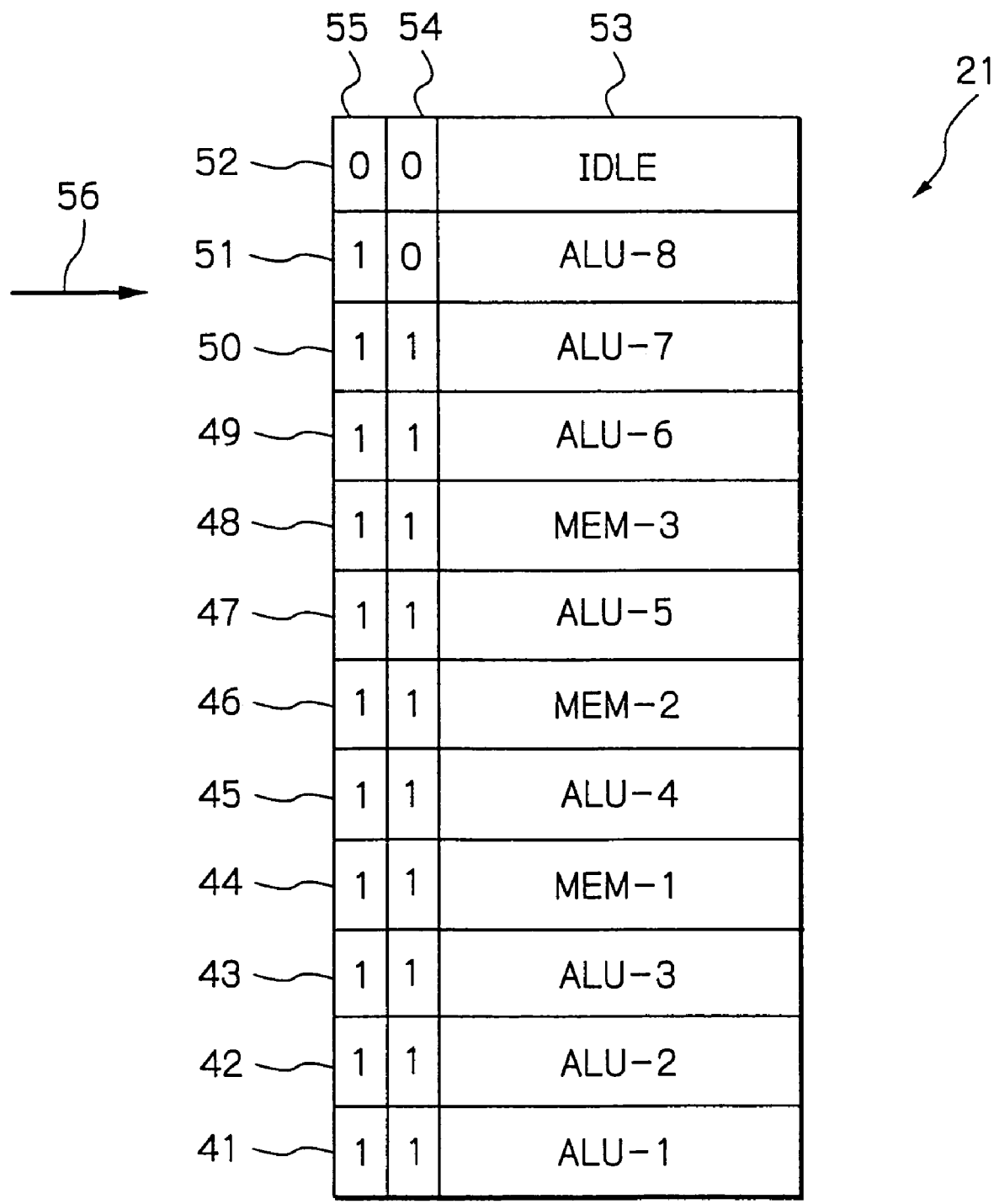
FIG. 14 shows the condition of the ROB to occur at a particular timing shown in FIG. 13.

FIG. 14 shows the instantaneous condition of the ROB 21 holding at the timing T8 indicated by an arrow in FIG. 12. As shown, the operation instructions ALU-1 through ALU-3 are registered at the entries #41 through #43, respectively. The memory access instruction MEM-1 is registered at the entry #44. The operation instructions ALU-4 is registered at the entry #45. The memory access instruction MEM-2 is registered at the entry #46 while the operation instruction ALU-5 is registered at the entry #47. The memory access instruction MEM-3 is registered at the entry #48 while the operation instruction ALU-6 is registered at the entry #49. Further, the operation instructions ALU-7 ALU-8 are registered at the entries #50 and #51, respectively. The entry #52 is idle.

In the condition shown in FIG. 14, the entries #41 through #50 are ready to be released. It will be seen that the limited resource of the ROB 21 can be used more efficiently when the buffer queue control is executed than when it is not executed.

In summary, in accordance with the present invention, priority is given to older instructions over newer instructions, so that the dependence of memory access instructions issued by in-order issuance can be rapidly canceled. This promotes the rapid issuance of a plurality of instructions.

Various modifications will become possible for those skilled in the art after receiving the teachings of the present disclosure without departing from the scope thereof.

What is claimed is:

1. An instruction buffer for a pipeline processor comprising:
   a sequence of instructions arranged in an order determined beforehand, wherein respective instructions of said sequence of instructions may include dependencies on other instructions of said sequence of instructions and wherein respective ones of said dependencies may be canceled upon issuance or execution of corresponding ones of said other instructions of said sequence of instructions;
   a first buffer including entries arranged in a preselected entry number order for storing respective instructions of said sequence of instructions; and
   a second buffer including other entries for storing instructions, wherein an instruction having no uncanceled dependencies, and thus capable of execution, stored in any one of said other entries earlier than other instructions is issued earlier than said other instructions stored in entries of said second buffer,
   wherein any one instruction of said sequence of instructions stored in any one of the entries of the first buffer designated by a relatively lower entry number than another instruction in another entry is prior, in order, to another instruction stored in another entry of the first buffer and containing an instruction designated by a relatively higher entry number than said one instruction of said sequence of instructions; and
   wherein said first and second buffers are each operable to concurrently issue, in said storage entry number order in a respective one of said first buffer and said second buffer, instructions having no uncanceled dependencies and which are thus capable of execution,
   wherein the entries of the first buffer each show whether or not the instruction stored therein is ready to be issued, and
   wherein the instruction first issued from among the entries of the first buffer whose instructions are ready to be issued is the entry having a lowest storage entry number among said entries of the first buffer whose instructions are ready to be issued.

2. The instruction buffer as claimed in claim 1, wherein the entries of the first buffer storing the instructions are lower in entry number than the entries storing no instructions.

3. A buffer queue control for a pipeline processor comprising:
   a reorder buffer for registering a plurality of instructions in an order of instructions;
   a first buffer for storing first instructions included in the plurality of instructions as first entries;
   a second buffer for storing, among the plurality of instructions, second instructions other than the first instructions;
   a said second instruction including an instruction having a dependency such that said second instruction should be issued after a said first instruction and wherein said dependency is canceled upon issuance of said first instruction corresponding to said dependency;
   said first buffer including a plurality of first entries for sequentially storing the first instructions in said order of instructions;
   said buffer queue control further comprising:
   means for releasing any one of the plurality of first entries that stores an instruction that is issued;
   means for shifting any one of the first instructions that is not issued to an entry prior, in order, by one;
   means for issuing one of the second instructions, which is earliest in said order of instructions and which has no uncanceled dependencies and thus can be executed;
   means for deleting any one of the plurality of instructions that has been executed and is earlier, in said order of instructions, than instructions not executed; and
   means for issuing any one of the first instructions that is earliest in said order of instructions and ready to be issued,
   wherein said second buffer comprises a plurality of second entries each for storing a particular one of the second instructions in said order of instructions, and an issuance pointer for controlling issuance of said second instruction, and
   wherein said reorder buffer comprises a head pointer indicative of an entry that has been issued last.

4. The buffer queue control as claimed in claim 3, wherein one of first instructions can be executed at the same time as one of second instructions.

5. The buffer queue control as claimed in claim 4, wherein the first instructions comprise operation instructions while the second instructions comprise memory access instructions.

6. The instruction buffer as claimed in claim 1, wherein said sequence of instructions are stored in accordance with respective dependencies, wherein said reorder buffer detects dependence of any one instruction of said sequence of instructions on another one instruction of said sequence of instructions, and wherein said dependency is reset upon satisfaction of said dependency by issuance of said another one instruction.

* * * * *